United States Patent [19]

Schaeff

[11] Patent Number: 4,502,709
[45] Date of Patent: Mar. 5, 1985

[54] ARTICULATED LOADER WITH TRANSVERSELY DISPLACEABLE COUNTERWEIGHT

[75] Inventor: Hans Schaeff, Langenburg, Fed. Rep. of Germany

[73] Assignee: Karl Schaeff GmbH & Co., Langenburg, Fed. Rep. of Germany

[21] Appl. No.: 361,429

[22] Filed: Mar. 24, 1982

[30] Foreign Application Priority Data

Aug. 8, 1981 [DE] Fed. Rep. of Germany ....... 3131512

[51] Int. Cl.³ ............................................. B66F 9/06
[52] U.S. Cl. ................................... 280/758; 172/611;
212/196; 280/400; 280/405 R; 280/405 B;
414/673
[58] Field of Search .............. 280/758, 757, 759, 400,
280/405 R, 405 B; 187/9 R, 94; 414/673, 719;
212/196, 197; 172/611

[56] References Cited

U.S. PATENT DOCUMENTS

| | | | |
|---|---|---|---|
| 2,693,250 | 11/1954 | Barrett | 280/759 X |
| 3,135,404 | 6/1964 | Pilch | 414/719 |
| 4,202,453 | 5/1980 | Wilkes, Jr. et al. | 212/196 X |
| 4,299,530 | 11/1981 | Schaeff | 280/758 X |

Primary Examiner—Joseph F. Peters, Jr.
Assistant Examiner—Mitchell J. Hill
Attorney, Agent, or Firm—Shlesinger, Arkwright, Garvey & Fado

[57] ABSTRACT

An articulated vehicle with pivoting motion, on which the forward carriage supports a loading shovel for a forklift and the rear carriage a counterweight, at least a portion of the counterweight being displaceably arranged on a rear guide mounted transversely to the rear carriage and being so connected with the forward carriage that for every pivoting excursion an opposite displacement of the counterweight is achieved.

14 Claims, 6 Drawing Figures

ARTICULATED LOADER WITH TRANSVERSELY DISPLACEABLE COUNTERWEIGHT

The invention concerns a vehicle with pivot means, comprising on its forward carriage a work means, in particular a load shovel or a fork means, with a counterweight mounted on the rear carriage.

The pivot means in such operational vehicles offers the advantage of greater maneuverability because the pivoting may be accomplished while the vehicle is stationary, whereby the pickup or deposition of loads for instance using fork devices is greatly faciitated operationally and most of all is also made possible in confined quarters.

On the other hand there are certain limits on handling loads as regards stability, or tipping over of the vehicle. By a steering motion of the pivot means, the load compensated in the ideal case by a counterweight moves over the center of gravity of the vehicle located approximately above the pivot means away from the longitudinal central axis toward the tip of the conceptual angle of which the sides pass through the wheel axles of the forward and rear carriages. As a consequence, the stability, i.e. the footing, of the vehicle is decreased and its tendency to tip over to the side of the pivot excursion increases. This is especially the case when the vehicle is made to operate on an uneven natural foundation and possibly is resting on three mutually disadvantageously bearing sites of this foundation.

It is the object of the invention to improve a controlled pivoting vehicle of the initially cited kind to the extent that by using relatively easily installed additional components, the resistance to tipping over of the vehicle is improved for the purpose of wider operational applications, without the total dimensions of the vehicle requiring enlargement at all or in any significant manner.

This problem is solved by the invention in that part of the counterweight is kept in displaceable manner within guide means mounted at the rear end of the rear carriage and extending in a direction generally transverse to the direction of travel and is so coupled by a control means with the forward carriage that any pivot excursion is associated with an especially proportional displacement of the counterweight opposite the direction of the pivot excursion.

By means of the proposed design, the counterweight is accordingly divided, whereby the displacement of the one part, for instance when the total weight is decreased, provides the same effectiveness as a larger weight. The proposal furthermore meets the desire to build such a vehicle so as to be as short as possible and to make possible thereby good maneuverability, where widely rearwardly projecting mountings of the vehicle engine or the like are foregone due to which such counterweight arrangements would block the view to the rear and the ground when putting the vehicle into place. The driver need not turn his attention from his operational equipment and from the field of maneuvering because the displacement of the counterweight is automatically actuated by the pivot control. Because the displaceable counterweight is moved in the direction opposite the pivoting excursion, it is possible to achieve a more than trivial compensation of the shift in center of gravity described above and hence improved footing of the vehicle.

In a preferred embodiment of the invention the displaceable counterweight may be of such a width as to correspond about to one fourth of the entire vehicle width. In this manner the center of gravity of the displaceable counterweight can be displaced over a still sufficiently large transverse dimension, across about $\frac{3}{4}$ of the vehicle width. Obviously further displacements of the counterweight resulting in still greater effectiveness are possible if the counterweight projects beyond the vehicle width from its end positions on its guide rails. This proposal can also be carried out with due regard for the maneuverability provided the end position of the counterweight projecting beyond the vehicle width still remain within the limit circle, that is the range described by the largest equipment size, for instance from the corner between the forward and backward edges of a loading shovel or from the boundaries of a load resting on a fork.

The drive means implementing the motion of the displaceable counterweight can be any of various accessories arbitrarily selected, for instance a fluid motor controlled by the steering hydraulics. Also, the drive means may preferably be a cable line hooked to the forward carriage. In an appropriate embodiment the displaceable counterweight can be connected by roller-guided cables on both sides of the rear carriage to the forward carriage and hence is controlled directly by the forward carriage's pivoting motions.

Further advantages and features of the invention are stated in the claims and the description below of an embodiment in relation to the drawings.

Figure 1:
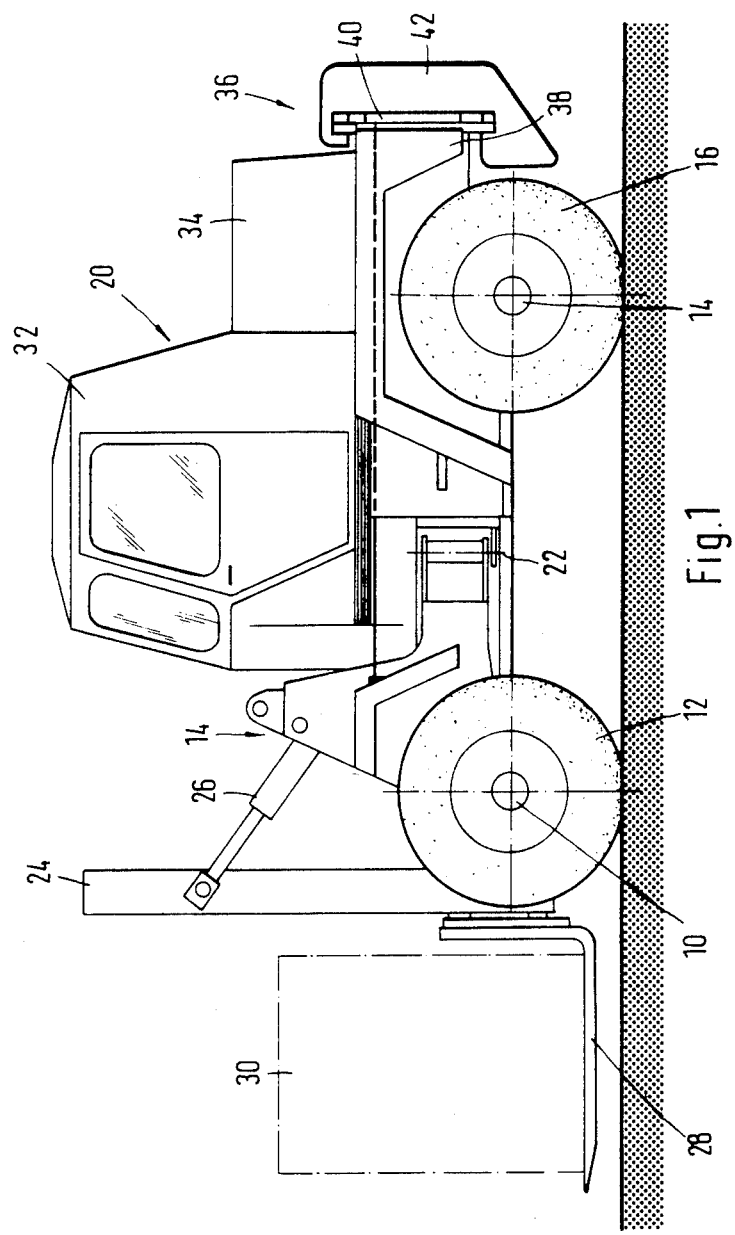
FIG. 1 is a side view of a pivoting loader of the invention provided with a fork lift means.

As shown in FIG. 1, an operational vehicle built as an articulated fork lift comprises a forward carriage 14 resting on a wheel axle 10 with wheels 12, and a rear carriage 20 resting on a wheel axle 14 and wheels 16, which are connected in conventional manner by a vertical hinge shaft 22. A lift structure 24 is assembled in hinging manner about a transverse shaft on the forward carriage 14 and adjustable in its inclination by a hydraulic cylinder 26. A stacking fork 28 is guided along the lift structure and holds a load as indicated, in a conventional manner.

The pivot axis 22 and part of the forward carriage are surmounted by the rear carriage 20 and its driver cab 32. The rear carriage 20 further comprises a drive unit 34 and a counterweight denoted as a whole by 36. The counterweight 36 includes a component 38 stationarily fixed to the rear carriage 20, a portion of which comprises a guide rail 40 for a laterally displaceable counterweight 42. The displaceable counterweight 42 comprises transverse clearances seating the upper and lower glide tracks of the guide rail 40 and which, as shown in FIG. 1, are partly enclosed by the counterweight 42. The particular configuration of the displaceable counterweight 42 shown in FIG. 1 is not mandatory, and may also be extended upward for instance without thereby significantly restricting the view of the driver.

Figure 2:
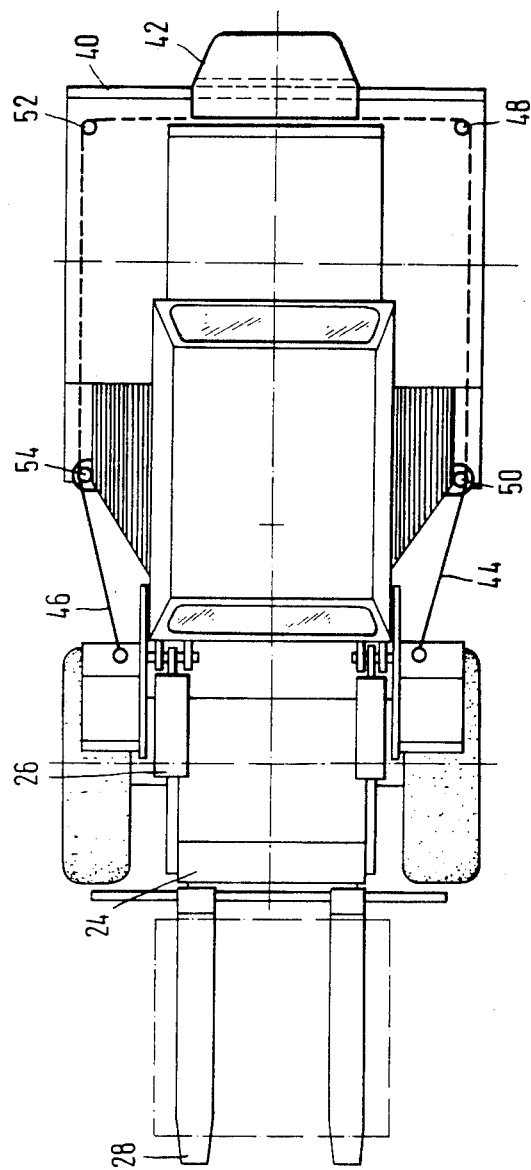
FIG. 2 is a top view of the vehicle of FIG. 1.

As shown in the top of FIG. 2, the counterweight shown has a width about one third that of the vehicle. Other dimensions are of course possible. It should be noted that the counterweight 42 displaceable on the guide means 40 is connected by cables 44, 46 and deflecting rollers 48, 50, 52 and 54 to the forward carriage 14 in such a manner that for the unpivoted state, the displaceable counterweight 42 is symmetrical with respect to the center longitudinal axis of the vehicle.

Figure 3:
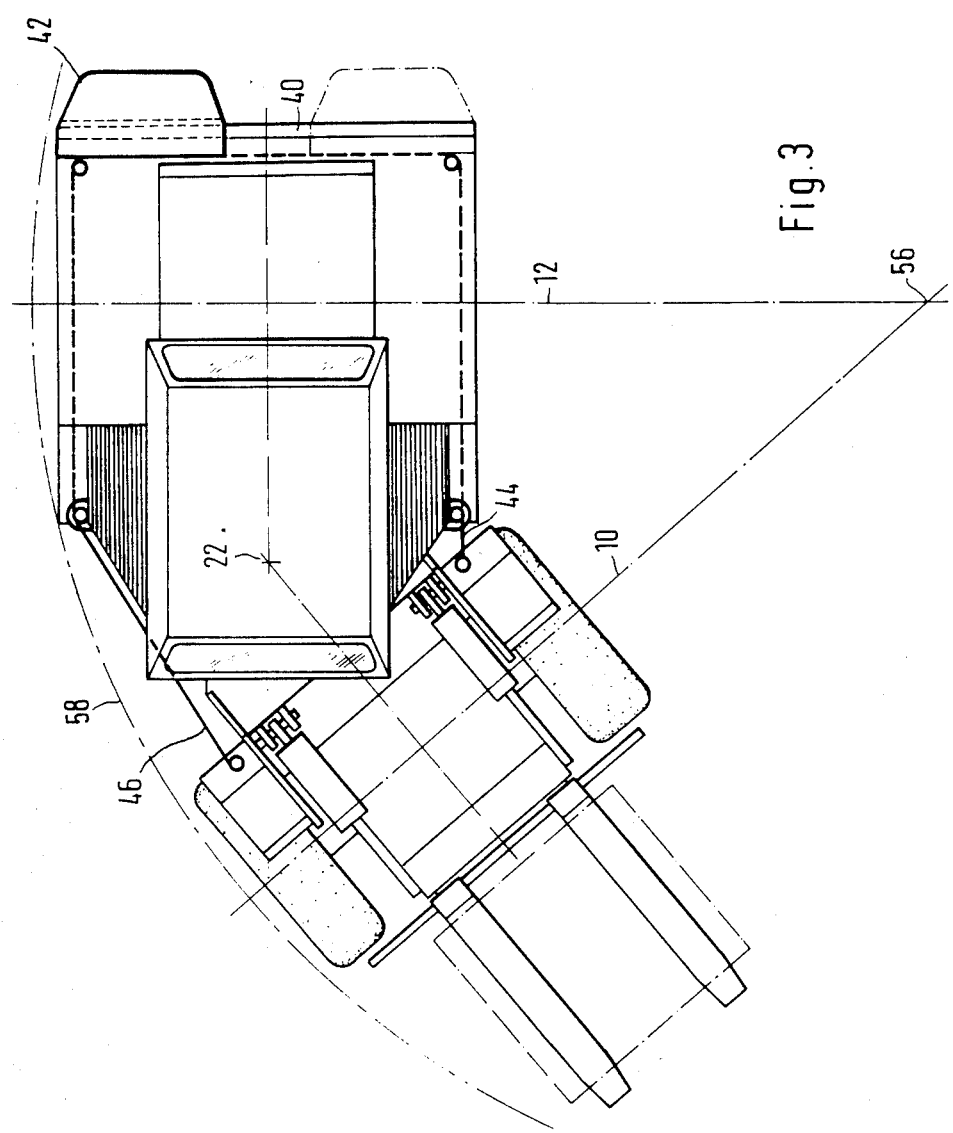
FIG. 3 is a top view similar to that of FIG. 2 but for a pivoted excursion between the forward and rear carriages and with a correspondingly displaced counterweight.

FIG. 3 shows the vehicle in a pivoted condition with the hydraulic steering jacks (not shown) being extended and retracted on either side of the hinge shaft. The extended axes of the wheel axles 10, 14 indicated in broken lines intersect at the center of curvature 56 for the range-circle 58, also indicated in broken lines through which the vehicle can move in the illustrated pivoted condition without impact on the outside. It will be noted displaceable counterweight 42 has been moved into the direction opposite to that of the pivoting excursion because the cables 44, 46 have been moved correspondingly by the forward carriage. Obviously the displaceable counterweight 42 might be further displaced laterally beyond the range-circle 58 by appropriate modification.

Figure 4:
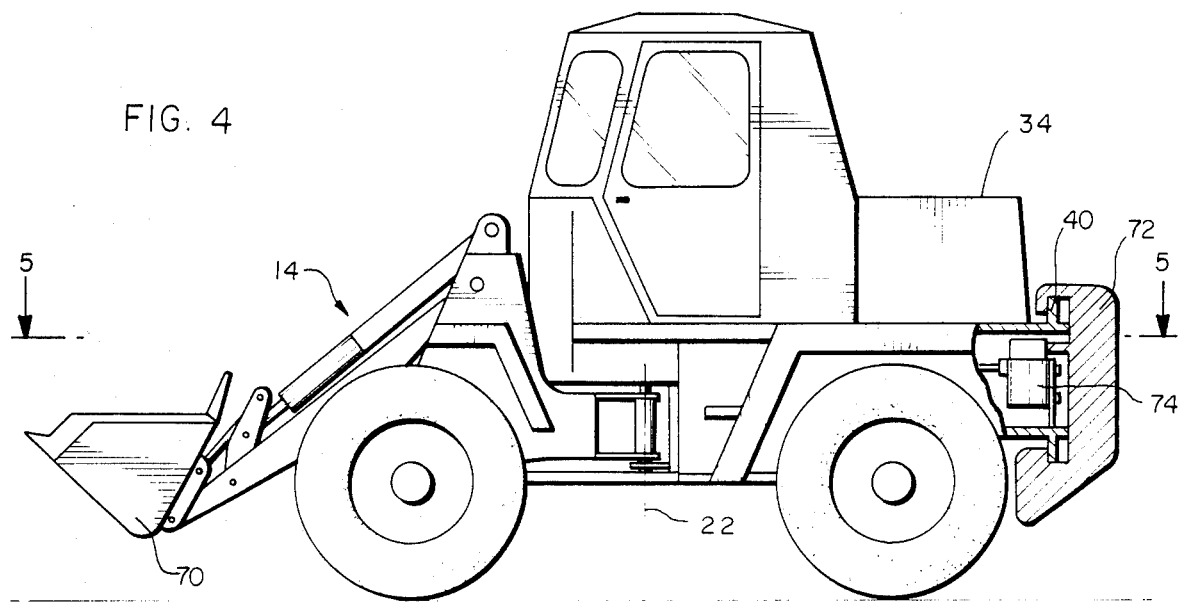
FIG. 4 is a side elevational view with portions broken away of another embodiment of the pivoting loader of FIG. 1.
Figure 5:
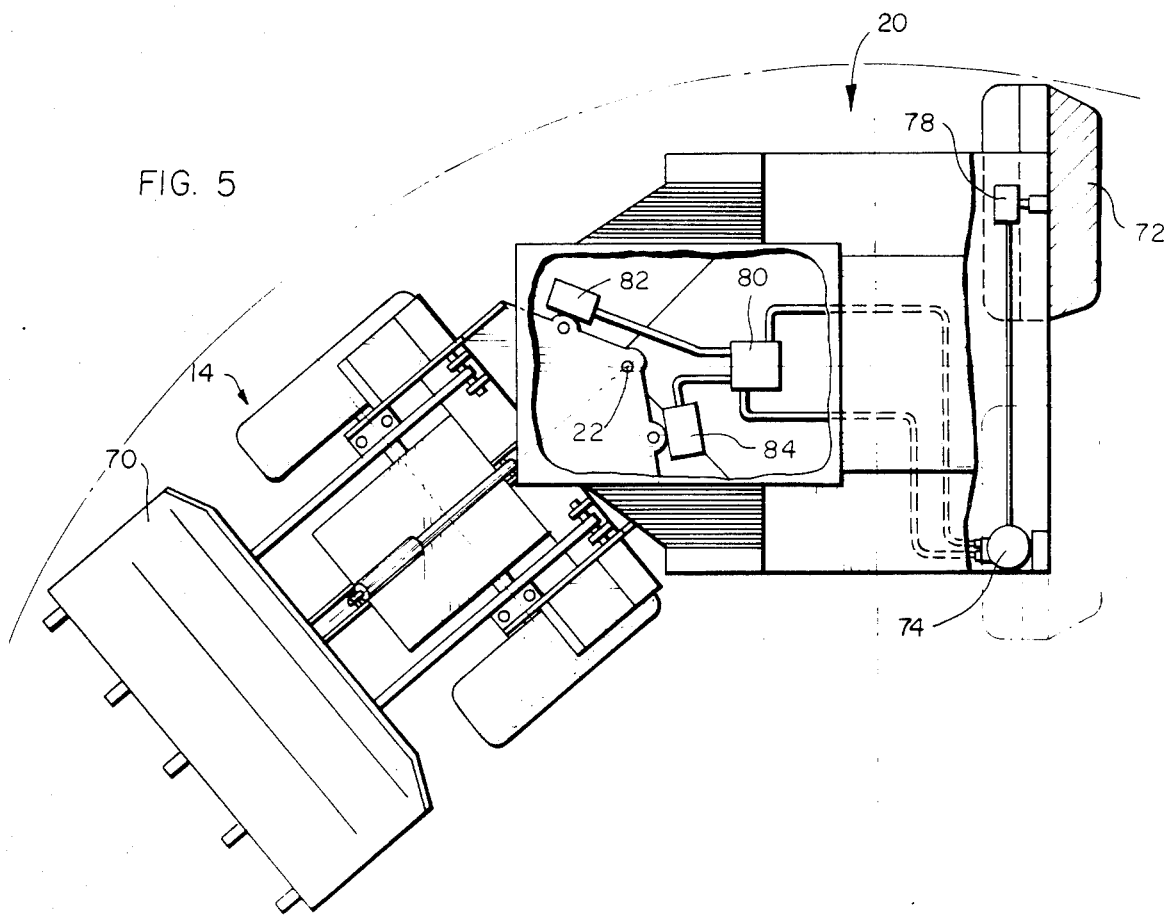
FIG. 5 is a cross-sectional view taken across the section 5—5 of FIG. 4 and viewed in the direction of the arrows, disclosing the loader pivoted and the counterweight shifted beyond the vehicle width and also disclosing the pivot control mechanism; and, FIG. 6 is a cross-sectional view similar to that of FIG. 5 and disclosing an hydraulic jack for displacing the counterweight.

As best shown in FIG. 4, a loading shovel 70 is mounted to forward carriage 14 in a manner well known in the art. Counterweight 72, which is similar to counterweight 42, is shiftably mounted on guide means 40. Fluid motor 74 is mounted on one side of rear carriage 20. As best shown in FIG. 5, displacement means 78 is connected to counterweight 72 and motor 74. Displacement means 78 cooperates with motor 74 for displacing counterweight 72 along guide means 40. Consequently, lateral displacement of counterweight 72 by operation of fluid motor 74 may be accomplished. It will be noted in FIG. 5 that counterweight 72 may be displaced so that a portion of the counterweight 72 extends beyond the sides of the rear carriage 20 when the counterweight 72 has been displaced to the ends of guide means 40.

As best shown in FIG. 5, front carriage 14 is pivoted with respect to rear carriage 20 around vertical hinge shaft 22. Counterweight 72 is associated with front carriage 14 such that proportional displacement of the counterweight 72 is associated with each pivoting excursion and in a direction opposite thereto. Conventional steering hydraulics 80, 82 and 84 are in fluid communication with motor 74 and are adapted for pivoting front carriage 14 in cooperation with motor 74. The conventional control means 80, 82 and 84 are of a type well known in the art and are associated with front carriage 14 and connected to the counterweight 72 whereby upon relative articulation of the forward carriage 14 and the rear carriage 20, the counterweight 72 is shifted laterally on guide means 40 proportionally to the degree of articulation and oppositely to the direction of articulation. Consequently, rotation of fluid motor 74 causes counterweight 72 to be displaced and in this way, pivoting of forward carriage 14 by displacement of the counterweight 72 may effectuated.

Figure 6:
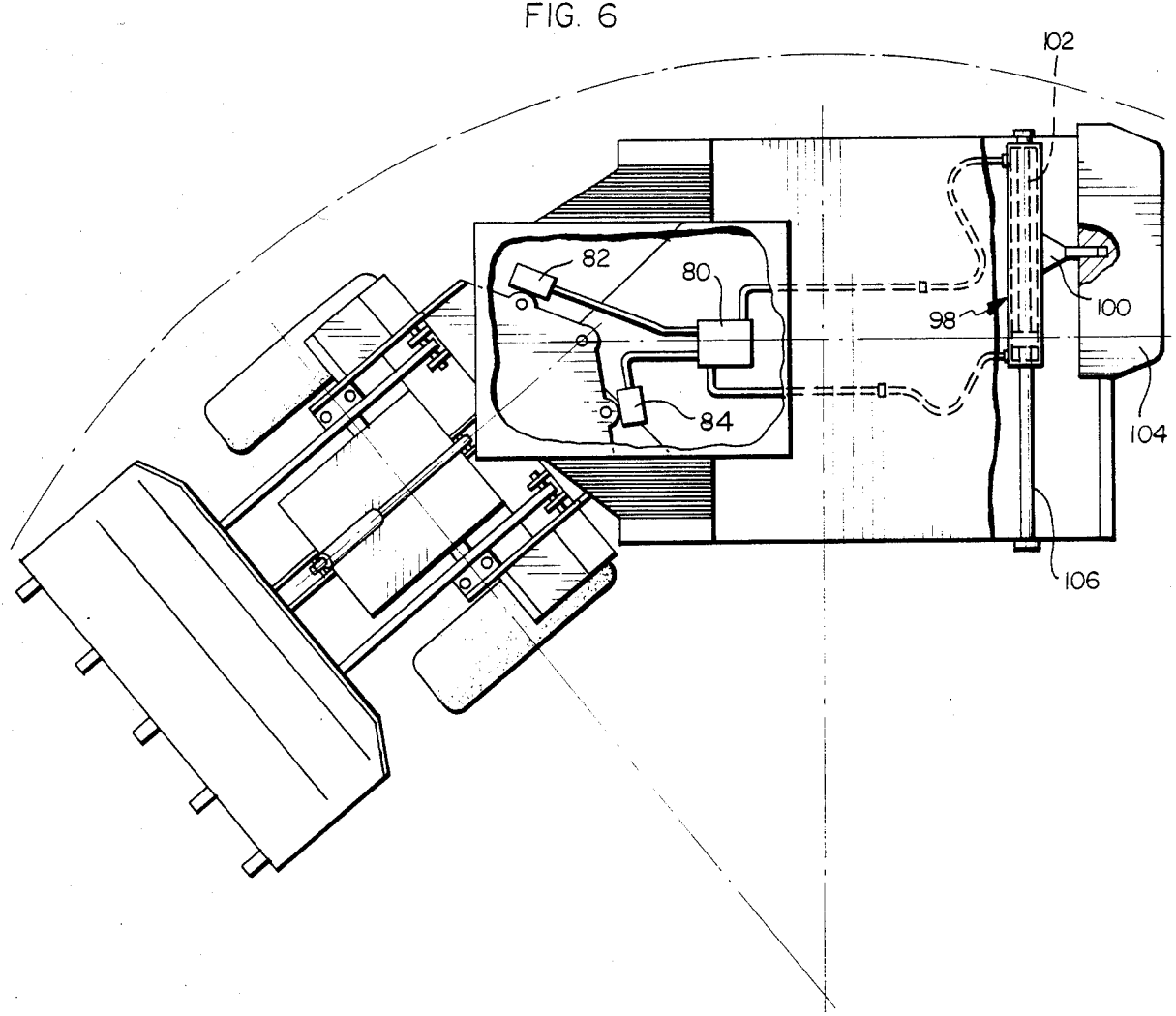

As best shown in FIG. 6, an hydraulic jack 98 is in fluid communication with means for supplying pressurized hydraulic fluid. Previously described conventional hydraulic control means 80, 82 and 84 are in fluid communication with jack 98. Hydraulic jack 98 includes connection 100 extending from cylinder 102 and connected to counterweight 104. Piston 106 is fixed to both sides of rear carriage 20 with the result that the displacement of cylinder 102 causes consequential displacement of counterweight 104 therefor.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. A pivoting vehicle, comprising:
   (a) a forward carriage and a rear carriage including a rear end portion;
   (b) hinge means defining a pivot axis connecting said forward and rear carriages to permit pivoting excursions of at least one of said carriages about said axis;
   (c) pivot control means associated with said forward and rear carriages for pivoting excursions of at least one of said carriages;
   (d) work means mounted to said forward carriage;
   (e) guide means mounted to said rear end portion and extending transversely thereof;
   (f) counterweight means mounted to said guide means and adapted for lateral displacement along said guide means; and,
   (g) control means associated with said counterweight means and said forward carriage for cooperative lateral displacement of said counterweight means by pivoting of at least one of said forward and rear carriages whereby proportional displacement of said counterweight means is associated with each pivoting excursion of at least one of said forward and rear carriages and in a direction opposite thereto.

2. An articulated vehicle, comprising:
   (a) a forward carriage;
   (b) work handling means mounted to said forward carriage;
   (c) a rear carriage, including a front end pivotally connected to said forward carriage;
   (d) guide means mounted to a rear end of said rear carriage and extending transversely thereto;
   (e) counterweight means shiftably mounted to said guide means;
   (f) means for pivotally articulating at least one of said forward and rear carriages; and,
   (g) control means associated with said forward carriage and said counterweight means whereby relative articulation of at least one of said carriages causes transverse shifting of said counterweight means on said guide means proportional to the degree of articulation and opposite to the direction of articulation.

3. The vehicle as described in claims 1 or 2, wherein:

(a) said guide means including a stationary portion of said counterweight.

4. The vehicle as defined in claim 3, wherein:
(a) said displaceable counterweight means having a width substantially ¼ that of said vehicle width.

5. The vehicle as defined in claim 4, wherein:
(a) said counterweight means projecting beyond said vehicle width when at an end of said guide means.

6. The vehicle as defined in claim 5, wherein:
(a) said control means including fluid motor drive means for displacing said counterweight means.

7. The vehicle as described in claim 6, wherein:
(a) said fluid motor drive means including an hydraulic jack; and,
(b) an hydraulic pivot control controlling said hydraulic jack.

8. The vehicle as defined in claim 5, wherein:
(a) cable means connecting said forward carriage and said counterweight means for displacing said counterweight means.

9. The vehicle as defined in claim 8, wherein:
(a) said rear carriage including sides;
(b) roller means mounted to each of said sides; and,
(c) said cable means cooperating with said roller means of each of said sides for thereby directly controlling said counterweight means by pivoting motions of said forward carriage.

10. The vehicle as defined in claim 3, wherein:
(a) said guide means including an upper and a lower glide track with a transverse clearance therebetween, said displaceable counterweight means enclosing at least a portion of said upper and lower glide tracks.

11. The vehicle as defined in claim 1, wherein:
(a) said work means including a loading shovel.

12. The vehicle as defined in claim 2, wherein:
(a) said work means including a loading shovel.

13. The vehicle as defined in claim 1, wherein:
(a) said work means including a fork device.

14. The vehicle as defined in claim 2, wherein:
(a) said work means including a fork device.

* * * * *